May 20, 1924.
J. H. COURNYER
SIPHON CREAM REMOVER
Filed Feb. 9, 1923
1,494,737
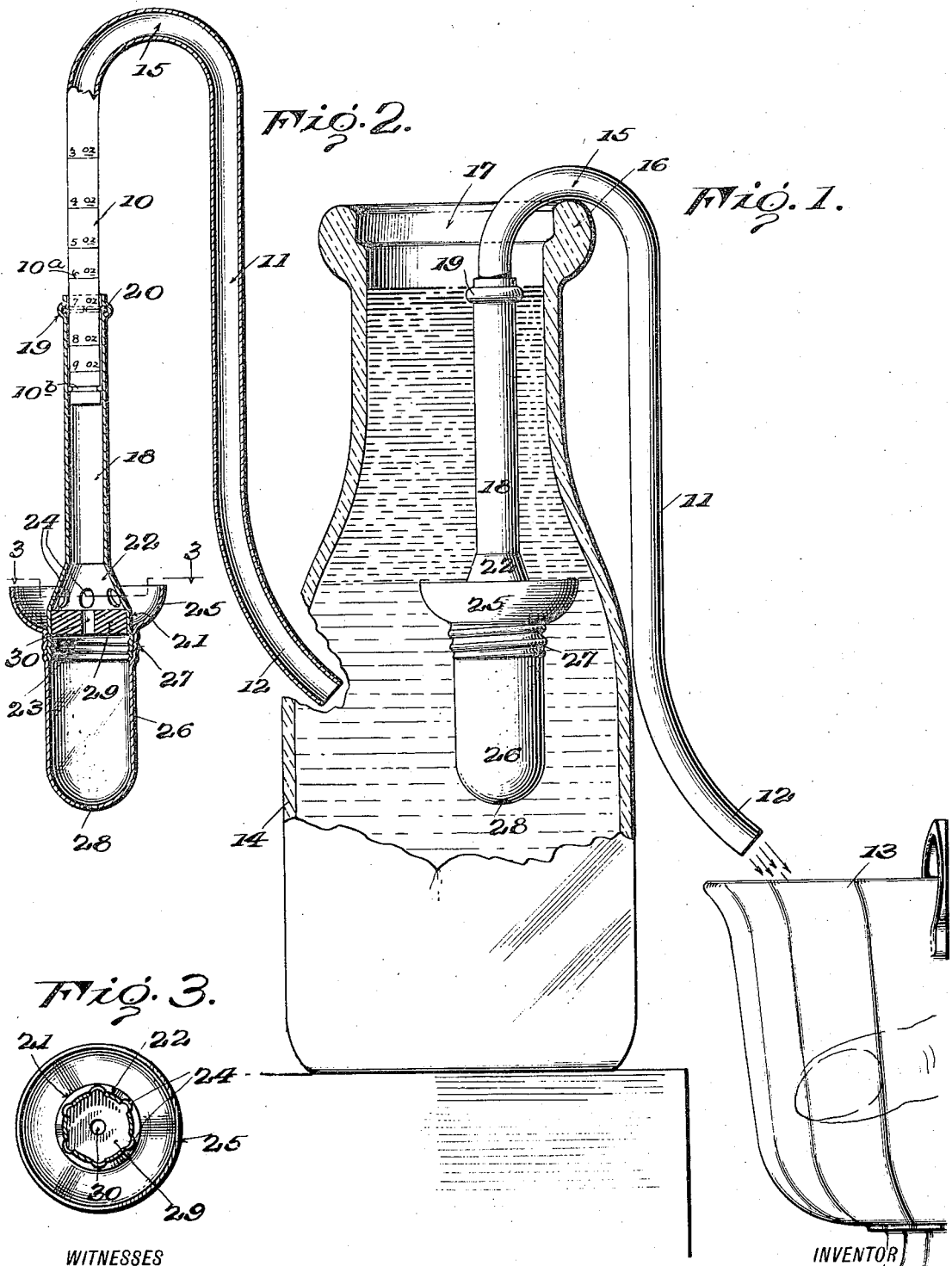
WITNESSES
W. A. Williams.
INVENTOR
James H. Cournyer
BY
Munn & Co
ATTORNEYS Patented May 20, 1924.

1,494,737

UNITED STATES PATENT OFFICE.

JAMES HERBERT COURNYER, OF OSKALOOSA, IOWA, ASSIGNOR TO SKIMIT MANUFACTURING COMPANY, OF OSKALOOSA, IOWA, A CORPORATION OF IOWA.

SIPHON CREAM REMOVER.

Application filed February 9, 1923. Serial No. 618,077.

*To all whom it may concern:*

Be it known that I, JAMES H. COURNYER, a citizen of the United States, and a resident of Oskaloosa, in the county of Mahaska and State of Iowa, have invented certain new and useful Improvements in Siphon Cream Removers, of which the following is a specification.

My present invention relates generally to siphon cream removers, and more particularly to one adaptable for ready insertion into and removal from milk bottles and like receptacles, my object being the provision of a simple inexpensive arrangement which is readily adjustable and which will operate to automatically start the siphon action by the simple act of inserting the device in operative position within the cream to be removed.

In the accompanying drawing which illustrates my present invention and forms a part of this specification, Figure 1 is a vertical sectional view through a milk bottle showing the practical application of my invention, Figure 2 is a vertical longitudinal section through my improved cream remover, and Figure 3 is a detail horizontal section taken therethrough substantially on line 3—3 of Figure 2.

Referring now to these figures and particularly to Figures 1 and 2 my invention contemplates a cream remover including a U-tube which is utilized in vertical position and includes side portions 10 and 11, the latter of which is somewhat longer than the former and constitutes an outlet leg preferably provided with an outwardly curved lower discharge end 12 to facilitate the discharge of cream into a bowl or other receptacle indicated at 13 in Figure 1 and placed to one side of the bottle or other receptacle 14 such as indicated in the same figure.

The other side portion 10 of the U-tube whose curved connecting section 15 is adapted to rest upon a portion of the edge 16 of the bottle surrounding its mouth 17, forms a part of the intake leg of the siphon and is adapted to slide at its free end in telescoping relation within a second tubular part 18 of the intake leg, which is of sufficiently greater diameter than the side portion 10 of the U-tube to permit thereof. This side portion 10 is preferably provided with graduations 10$^a$ cooperating with the upper end of the tubular lower part 18 of the intake tube to indicate the amount of cream in ounces which may be removed in each adjusted portion, and also has an annular groove 10$^b$ adjacent to its lower end for a purpose to be presently described.

At its inner or upper telescoping end the lower part 18 of the U-tube, which is thus adapted for ready adjustment to lengthen or shorten the intake leg, has an external annular rib 19 which forms an internal annular groove receiving a curved spring 20 which constitutes a frictional gripping element for engagement with the external surface of the inner part 10 of the intake leg so as to hold the two parts 10 and 18 in selectively adjusted position. When drawn out to a sufficient extent the spring 20 will engage within the beforementioned groove 10$^b$ and in this way indicate the limit of adjustment has been reached without actually preventing complete disengagement of the lower section 18. At its lower end the lower part 18 of the intake leg has an enlarged cylindrical portion 21, connected thereto by a tapering portion 22, the former having a threaded section 23 and the latter having an annular series of fluid intake apertures 24.

The tapering portion 22 is surrounded by an upwardly opening bowl 25 at the upper end of a cylindrical air entrapping member 26 provided at the base of the bowl 25 with a threaded section 27 for engagement upon the threaded section 23 of the intake leg. The lower end of this air entrapping member 26 is closed except for a centrally located inlet aperture 28, communication being limited between the air chamber within the entrapping member 26 and the lower portion 18 of the intake leg, by virtue of a disc or plug 29 located in the cylindrical lower portion 21 of the intake leg below the fluid intake apertures 24 and provided with a central opening 30.

In the use of my improved cream remover adjustable portions of the intake leg are first moved relative to one another until the distance between the lower surface of the upper curved portion 15 of the siphon tube and the upper edge of the fluid intake bowl 25 corresponds to the depth of the cream to be removed. The intake leg of the siphon tube with the parts carried thereby is then inserted downwardly into the cream until the curved portion 15 rests upon the upper edge of the bottle as in Figure 1. During the downward movement of the air entrapping cylinder 26, air is entrapped within its internal chamber and the pressure of the fluid entering through the lower aperture 28 forces this air into the lower portion of the intake leg through the aperture 30 of the plug 29 so that this air as it strikes the cream entering through the fluid intake apertures 24 of the intake leg forms bubbles which break the column of cream and assist in carrying the air and cream upwardly through the intake leg and around the curved upper portion of the siphon tube so as to thus start the siphon action the effect of which is to withdraw all of the cream or fluid from the bottle to the line of the upper edge of the bowl 25. In this way the siphon action is automatically started by the simple act of inserting the siphon remover into its effective position and, in as much as the depth of the cream can be accurately determined in the case of a milk bottle and the like such as indicated in Figure 1 and the intake leg easily adjusted to correspond therewith it is obvious that the subsequent insertion of the device simply involves the downward movement of the intake leg within the bottle until the curved upper portion of the siphon tube rests upon the bottle edge. In this way practically nothing is left to guesswork and the effectiveness of the implement as a whole is greatly increased in its use for the removal of cream in the manner described.

I claim:

1. A siphon cream remover having intake and outlet legs, and means at the lower end of the intake leg to entrap air when said leg is thrust downwardly into the fluid to be removed, said air entrapping means including an air chamber having limited communication at its upper portion with the intake leg and having a lower opening into said chamber and said intake leg having fluid intake apertures located above the point of communication between this leg and the said chamber of the air entrapping means.

2. A siphon cream remover having intake and outlet legs, said intake leg having fluid intake openings adjacent to its lower end, an air entrapping member at the lower end of the intake leg, having an air chamber and having a lower opening into said chamber, and means within the lower portion of the intake leg, below the said fluid intake openings for establishing limited communication between the interior of the said intake leg and the said air chamber.

3. A cream remover including a siphon tube of which the intake leg is in adjustable sections and is provided at its lower intake end with an enlarged portion and a tapering portion adjacent to the enlarged portion provided with fluid intake openings, an air entrapping member threaded in connection with the said lower enlarged portion of the intake leg, having an air chamber therein and having an aperture at its lower end, and a plug within the lower enlarged portion of the intake leg having an aperture establishing communication between the interior of the air entrapping member and the lower portion of the intake leg below the fluid intake openings.

4. A cream remover including a siphon tube of which the intake leg is in adjustable sections and is provided at its lower intake end with an enlarged portion and a tapering portion adjacent to the enlarged portion provided with fluid intake openings, an air entrapping member threaded in connection with the said lower enlarged portion of the intake leg, having an air chamber therein and having an aperture at its lower end, and a plug within the lower enlarged portion of the intake leg having an aperture establishing communication between the interior of the air entrapping member and the lower portion of the intake leg below the fluid intake openings, said air entrapping member having an upper flaring bowl-like extension surrounding the lower tapering portion of the intake leg in spaced relation.

JAMES HERBERT COURNYER.